United States Patent
Georgy et al.

(10) Patent No.: US 9,880,005 B2
(45) Date of Patent: Jan. 30, 2018

(54) METHOD AND SYSTEM FOR PROVIDING A PLURALITY OF NAVIGATION SOLUTIONS

(71) Applicant: TRUSTED POSITIONING, INC., Calgary (CA)

(72) Inventors: Jacques Georgy, Calgary (CA); Ardalan Heshmati, San Jose, CA (US); Christopher Goodall, Calgary (CA); Rahul Bakshi, San Jose, CA (US)

(73) Assignee: InvenSense, Inc., San Jose, CA (US)

( * ) Notice: Subject to any disclaimer, the term of this patent is extended or adjusted under 35 U.S.C. 154(b) by 58 days.

(21) Appl. No.: 14/883,484

(22) Filed: Oct. 14, 2015

(65) Prior Publication Data
US 2017/0010098 A1   Jan. 12, 2017

Related U.S. Application Data

(60) Provisional application No. 62/190,349, filed on Jul. 9, 2015.

(51) Int. Cl.
  *G01C 21/20* (2006.01)
  *G01S 19/42* (2010.01)
  (Continued)

(52) U.S. Cl.
  CPC .......... *G01C 21/20* (2013.01); *G01C 21/005* (2013.01); *G01C 21/165* (2013.01); *G01S 19/42* (2013.01);
  (Continued)

(58) Field of Classification Search
  USPC ........ 701/408, 473, 479, 541, 491; 342/358, 342/357.3
  See application file for complete search history.

(56) References Cited

U.S. PATENT DOCUMENTS

| | | | |
|---|---|---|---|
| 6,246,960 B1* | 6/2001 | Lin | G01C 21/165 701/472 |
| 6,311,129 B1* | 10/2001 | Lin | G09B 9/08 342/422 |

(Continued)

OTHER PUBLICATIONS

Vehicle navigator using a mixture particle filter for inertial sensors/odometer/map data/GPS integration; Jacques Georgy; Aboelmagd Noureldin; Chris Goodall; IEEE Transactions on Consumer Electronics; Year: 2012, vol. 58, Issue: 2 pp. 544-552, DOI: 10.1109/TCE.2012.6227459.*

(Continued)

*Primary Examiner* — Cuong H Nguyen
(74) *Attorney, Agent, or Firm* — Bay Area Technology Law Group PC

(57) ABSTRACT

Systems and methods are disclosed for providing a plurality of navigation solutions using a portable sensor device associated with a user. Motion sensor data may be used to derive a first navigation solution using the obtained sensor data under a first set of processing conditions navigation solution and to derive at least a second navigation solution using the sensor data under a second set of processing conditions, wherein the second navigation solution is refined as compared to the first navigation solution. As such, the second navigation solution may represent a more accurate or more complete solution, with the first navigation solution may represent a reduced expenditure of resources. The system includes the portable sensor device and optionally may include an auxiliary device associated with the user and/or remote processing resources. The functions associated with deriving the first and second navigation solutions may be performed by any one or any combination of the portable sensor device, the auxiliary device and/or the remote processing resources.

55 Claims, 11 Drawing Sheets

(51) Int. Cl.
*G01C 21/00* (2006.01)
*G01C 21/16* (2006.01)
*H04W 52/02* (2009.01)
*G01S 19/49* (2010.01)

(52) U.S. Cl.
CPC ......... *G01S 19/49* (2013.01); *H04W 52/0251* (2013.01)

(56) References Cited

U.S. PATENT DOCUMENTS

| | | | | |
|---|---|---|---|---|
| 2007/0010936 A1* | 1/2007 | Nordmark | ............ | G01C 21/165 701/472 |
| 2012/0221244 A1* | 8/2012 | Georgy | ................ | G01C 21/165 701/472 |
| 2014/0372026 A1* | 12/2014 | Georgy | .................. | G01S 19/47 701/469 |
| 2015/0039220 A1* | 2/2015 | Georgy | ................ | G01C 21/165 701/400 |
| 2015/0204983 A1* | 7/2015 | Georgy | .................. | G01S 19/49 701/469 |
| 2016/0252354 A1* | 9/2016 | Georgy | ................ | G01C 21/165 701/500 |
| 2017/0010098 A1* | 1/2017 | Georgy | .................. | G01S 19/42 |

OTHER PUBLICATIONS

Optimization of the low-cost INS/GPS navigation system using ANFIS for high speed vehicle application; E. S. Abdolkarimi; M. R. Mosavi; A. A. Abedi; S. Mirzakuchaki; 2015 Signal Processing and Intelligent Systems Conference (SPIS); Year: 2015 pp. 93-98, DOI: 10.1109/SPIS.2015.7422319.*

A novel systems integration approach for multi-sensor integrated navigation systems; Mohamed Atia; Chris Donnelly; Aboelmagd Noureldin; Michael Korenberg; 2014 IEEE International Systems Conference Proceedings; Year: 2014 pp. 554-558, DOI: 10.1109/SysCon.2014.6819310.*

Pseudoranges Error Correction in Partial GPS Outages for a Non-linear Tightly Coupled Integrated System; Umar Iqbal; Jacques Georgy; Walid F. Abdelfatah; Michael J. Korenberg; Aboelmagd Noureldin; IEEE Transactions on Intelligent Transportation Systems; Year: 2013, vol. 14, Issue: 3; pp. 1510-1525, DOI: 10.1109/TITS.2013.2264474.*

* cited by examiner

METHOD AND SYSTEM FOR PROVIDING A PLURALITY OF NAVIGATION SOLUTIONS

CROSS REFERENCE TO RELATED APPLICATIONS

This application claims priority from and benefit of U.S. Provisional Patent Application Ser. No. 62/190,349 filed Jul. 9, 2015, which is entitled "METHOD AND SYSTEM FOR SPORTS NAVIGATION," which is assigned to the assignee hereof and is incorporated by reference in its entirety.

FIELD OF THE PRESENT DISCLOSURE

This disclosure generally relates to providing a navigation solution for a portable device, such as a portable device used to track the activity of a user. More particularly, the portable device, alone or in combination with other resources, may be used to provide a plurality of navigation solutions, with each navigation solution representing a different balance of resource expenditure and degree of refinement.

BACKGROUND

Portable electronic devices, such as those configured to be handheld or otherwise associated with a user, are employed in a wide variety of applications and environments. The ubiquity of such devices as mobile phones, wearables, including smart watches and glasses, digital still cameras and video cameras, handheld music and media players, portable video game devices and controllers, tablets, mobile internet devices (MIDs), personal navigation devices (PNDs), other APPlication acCESSORIES (or Appcessories for short) and other similar devices speaks the popularity and desire for these types of devices. Increasingly, such devices are equipped with one or more sensors or other systems for determining the position or motion of the portable device.

Information obtained from such sensors regarding motion of a portable device has been leveraged to provide information about the behavior and physical activity of a user. In turn, this information has been extensively applied in different fields such as navigation and localization, health monitoring, emergency services, athletic training, sport rehabilitation, elderly assistance and others. For example, a portable device may provide a navigation solution having information about the user's activity to track, record and/or analyze aspects of the users motion. In one aspect, such a navigation solution may include information concerning the position, motion and/or attitude of the device. Accordingly, a complete navigation solution may include position, velocity and attitude information and a partial navigation solution may include only position and attitude, only attitude and velocity, only attitude or other combinations. A navigation solution may also include values derived from other navigation solution values, such as speed and/or distance traveled. As will be recognized, this information may be used in a variety of con texts, such as determining and assessing aspects of physical exercise in which the user may be engaged.

Notably, different navigation solutions may represent different degrees of refinement. As indicated, a complete navigation solution may include position, velocity and attitude information and a partial navigation solution may include only a subset of this information, or quantities derived from a navigation solution. Additionally, the information provided have different degrees of refinement with respect to the accuracy of some or all of the information. Generally, a more complete or more accurate navigation solution may involve a greater expenditure of resources than a less complete or less accurate navigation solution. As such, a "partial" navigation solution may include only position and attitude, only attitude and velocity, only attitude or other subsets of a complete navigation solution and may also include quantities that may be derived from a navigation solution, such as distance traveled and/or speed. However, each degree of refinement may be useful in different contexts. For example, it may be desirable to provide a relatively less refined navigation solution in a more immediate or more economical manner while different benefits, such as greater accuracy or more complete information, may be obtained from a relatively more refined navigation solution when greater resources are available.

Motion sensors, such as accelerometers, gyroscopes, magnetometers and the like may be used to provide self-contained navigation information based on extrapolating a subsequent position or orientation of the portable device relative to a previous position or orientation. Such self-contained navigation information may be used in the alternative or as a supplement to absolute sources of navigation information, i.e., reference-based techniques, such as satellite or other wireless based navigation systems. It would be desirable to leverage information from any available source, including self-contained motion sensor based information and/or absolute sources of navigation information, in order to provide a plurality of navigation solutions. Further, it would be desirable for each of the plurality of navigation solutions to represent a different degree of refinement, so that a specific allocation of resources may be used for each navigation solution. As will be described in the following materials, this disclosure satisfies these and other needs.

SUMMARY

As will be described in detail below, this disclosure includes a method for providing a plurality of navigation solution by providing a portable sensor device associated with a user, obtaining sensor data from the portable sensor device indicative of movement of the user, deriving a first navigation solution using the obtained sensor data under a first set of processing conditions and deriving at least a second navigation solution using the obtained sensor data under a second set of processing conditions, wherein the second navigation solution is refined as compared to the first navigation solution.

This disclosure also includes a system for providing a plurality of navigation solutions, including a portable sensor device associated with a user outputting sensor data indicative of movement of the user, a first set of processing conditions configured to derive a first navigation solution using the sensor data and a second set of processing conditions configured to derive a second navigation solution using the sensor data, wherein the second navigation solution is refined as compared to the first navigation solution.

DETAILED DESCRIPTION

Figure 1:
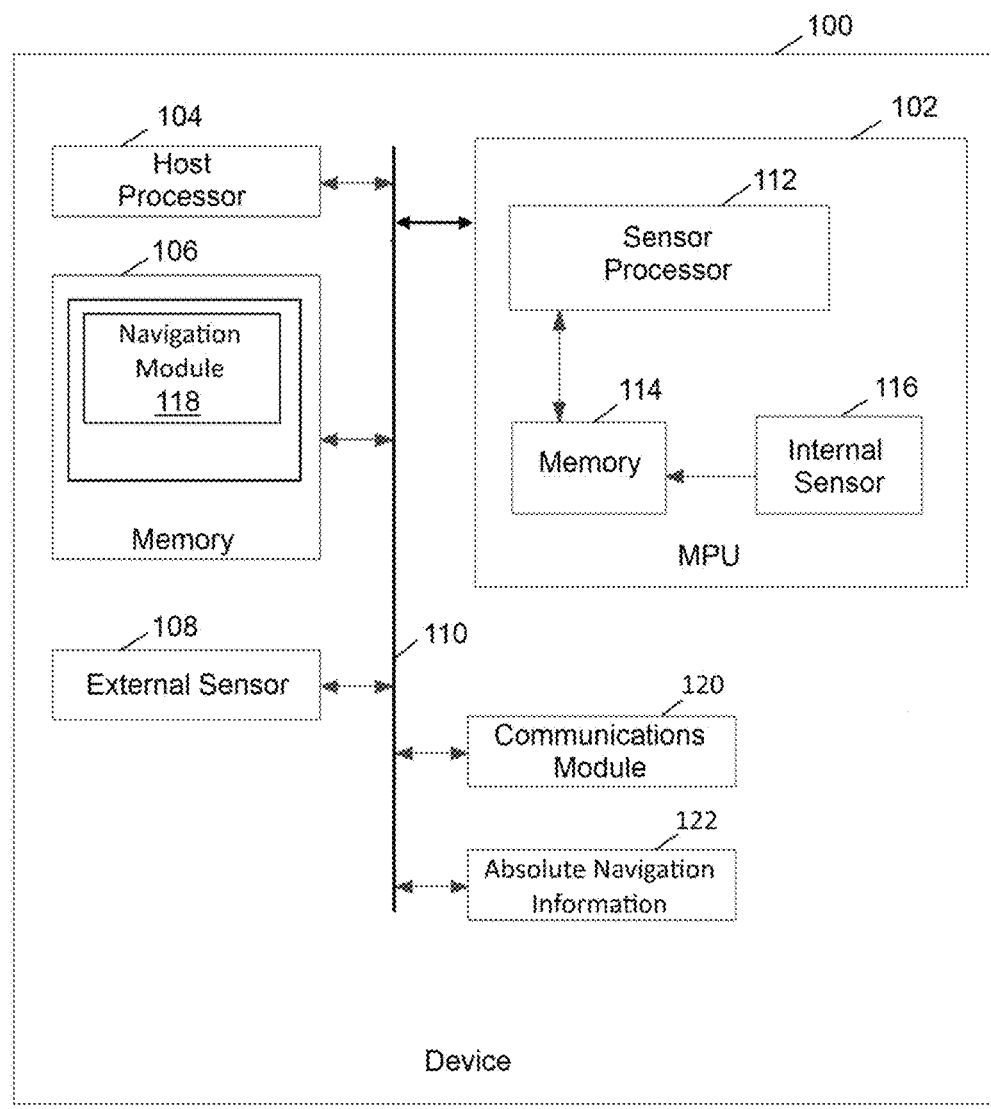
FIG. 1 is schematic diagram of a portable device for providing a plurality of navigation solutions according to an embodiment.

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is few the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments in which the present disclosure can be practiced. The term "exemplary" used throughout this description means "serving as an example, instance, or illustration" and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings or chip embodiments. These and similar directional terms should not be construed to limit the scope of the disclosure in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor. For example, a carrier wave may be employed to carry computer-readable electronic data such as those used in transmitting and receiving electronic mail or in accessing a network such as the Internet or a local area network (LAN). Of course, many modifications may be made to this configuration without departing from the scope or spirit of the claimed subject matter.

The various illustrative logical blocks, modules, circuits and instructions described in connection with the embodiments disclosed herein may be executed by one or more processors, such as one or more motion processing units (MPUs), digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an MPU and a microprocessor, a plurality of microprocessors, one or more microprocessors in conjunction with an MPU core, or any other such configuration.

Unless defined otherwise, all technical and scientific terms used herein have the same meaning as commonly understood by one having ordinary skill in the art to which the disclosure pertains.

Finally, as used in this specification and the appended claims, the singular forms "a, "an" and "the" include plural referents unless the content clearly dictates otherwise.

As described, a portable device may be provided to derive a navigation solution having information about the user's activity to track, record and/or analyze aspects of the user's motion. A navigation solution according to this disclosure may include any information concerning the position, motion and/or orientation of the device. In one aspect, the navigation solution may include any combination of position, velocity and/or attitude information, or related/derived quantities. For example, a complete navigation solution may include position, velocity and attitude information and a partial navigation solution may include only position and attitude, only attitude and velocity, only attitude or other combinations. A navigation solution may also include values related to or derived from other navigation solution values, such as speed and/or distance traveled alone or in combination with other quantities. Further, information from any available source, including self-contained motion sensor based information and/or absolute sources of navigation information, may be used to derive a plurality of navigation solutions, each representing a different balance of resource expenditure. A greater expenditure of resources may involve employing the same input data, but subjecting that data to more complete or more thorough analysis, may involve employing a greater quantity of input data or both. Likewise, a reduced expenditure of resources may involve employing a less complex or less thorough analysis, may involve fewer data inputs or both.

In some contexts it may be desirable to minimize or reduce the expenditure of resources, even though the corresponding navigation solution may not be as complete or as accurate and therefore may be less refined. As used herein, the term "refined" or "more refined" means a navigation solution that is more complete, has a greater range of information, is more accurate, and/or is enhanced or improved in any manner. For example, a first navigation solution may be provided that is less refined and therefore represents a reduced resource expenditure. Any number of circumstances may make a less refined navigation solution advantageous, including reduction of power consumption when employing a battery powered device, when reduced processing capabilities are available, when a more immediate solution is preferred, or other analogous situations. Similarly, any number of circumstances may make a more refined navigation solution advantageous, including when a source of power is available, when greater processing capabilities are available, when a greater amount of time may be used to process the information to provide the navigation solution, or other analogous situations.

The techniques of this disclosure can work with any type of portable device as desired, including a smartphone or the other exemplary devices noted below. So in one embodiment the portable device may be a smartphone. In another embodiment, the portable device may be a wearable device. In other embodiments, it may be another type of portable device. It will be appreciated that such devices are often carried or associated with a user and thus may represent a convenient option for tracking fitness or physical activity as well as for other applications that may benefit by providing navigation solutions under varying processing conditions.

As an illustration, in one embodiment a portable device may be configured as a wearable device, such as a fitness bracelet or the equivalent. Such wearable devices may rely on battery for power and/or may have relatively reduced processing capabilities. Nevertheless, it may be desirable to provide a first navigation solution that may be constrained by any of these or other limitations, such as to give the user real time feedback about the activity. Likewise, at least a second navigation solution may be provided using the data gathered by the wearable device under a different set of processing conditions. The second navigation solution may be based on the same data inputs as the first navigation solution or may include supplemental information from any suitable source. The different processing conditions may be represented by processing the data with a different device, either locally to the wearable, such as by using another device associated with the user, or remotely, such as in a cloud based strategy using a server accessed over a network. Alternatively, the different processing conditions may be represented by the wearable device itself, such as when the wearable device is charging and is not constrained by battery power, when greater time is available to perform the processing associated with deriving the second navigation solution or any other similar circumstances.

Certain details regarding one embodiment of a navigation system exhibiting features of this disclosure in the form of mobile or portable device 100 are depicted as high level schematic blocks in FIG. 1. As will be appreciated, device 100 may be implemented as a device or apparatus that is configured to be worn, such as a watch, wrist band, ring, pedometer, anklet or the like. However, as used herein, the term "portable device" also includes a device that may be physically associated with a user, such as a handheld device that may be carried by the user or to be used with an accessory that physically associates the device with a user, such as a holster, arm band or similar structures. In another context, the portable device may also be secured or simply resting on a platform that is conveying the user, such as an automobile, vessel, or other motorized vehicle. A platform conveying the user may also include pedal powered vehicles, such as bicycles, unicycles, tricycles and vehicles having other numbers of wheels, rowing powered vessels, such as boats, kayaks, canoes, sculls and the like, as well as other vehicles or vessels that are powered by the user. The portable device may be implemented in any suitable form factor, for example as a mobile phone (e.g., cellular phone, a phone running on a local network, or any other telephone handset), personal digital assistant (PDA), tablet video game player, video game controller, navigation device, mobile internet device (MID), personal navigation device (PND), digital still camera, digital video camera, binoculars, telephoto lens, portable music, video, or media player, remote control, or other handheld device, or a combination of one or more of these devices.

In some embodiments, portable device 100 may be a self-contained device that includes sufficient computational and interface resources to provide the functions associated with this disclosure, including obtaining sensor data, obtaining absolute navigational information if available, and providing at least a first navigation solution. As such, portable device 100 may also be configured to provide a second navigation solution that is more refined titan the first navigation solution by employing different processing conditions. Illustrative examples of different processing conditions include a more robust source of power, greater time to perform the associated processing, activation of more functional components of portable device 100, and others. However, in other embodiments, portable device 100 may function in conjunction with one or more other devices to derive at least a second navigation solution. The one or more other devices may be portable, such as those noted above, or non-portable devices such as a desktop computer, an electronic tabletop device, a server computer, any other implementation of remote processing capabilities, and the like, any of which can communicate with portable device 100. e.g., via wired or wireless network connections. As will be described below, portable device 100 may communicate directly with the other device that derives the second navigation solution or may relay communications through yet another device. Accordingly, portable device 100 may be capable of communicating via a wired connection using any type of wire-based communication protocol (e.g., serial transmissions, parallel transmissions, packet-based data communications), wireless connection (e.g., electromagnetic radiation, infrared radiation or other wireless technology), or a combination of one or more wired connections and one or more wireless connections.

Therefore, depending on the embodiment, portable device 100 may include at a minimum one or more sensors outputting motion data that may be used to derive the first navigation solution by employing a first set of processing conditions. The first navigation solution may be derived by portable device 100 or by an auxiliary associated local device. Portable device 100 may also include a source of absolute navigation information that may be used to supplement or aid the derivation of the first navigation solution, or may obtain absolute navigation information from another associated device. The other functions associated with this disclosure, including deriving at least a second navigation solution by employing a second set of processing conditions, such that the second set of processing conditions is different than the first set of processing conditions, as well as others, may be implemented either in portable device 100 or in one or more other devices as desired and depending on the relative capabilities of the respective devices. As an example, portable device 100 may be used in conjunction with an auxiliary device, such as a smart phone or tablet, and/or remote processing resources, either of which may be used to perform any or all of the functions other than outputting sensor data. Any combination of the involved functions may be distributed among as many local and remote devices as desired. For purposes of illustration and not limitation, a first device may have the sensor that is physically associated with the user and may or may not derive the first navigation solution and/or second navigation solutions, a second device may be local and may derive the first navigation solution if not derived by the first device. The second device may also derive the second navigation solution and/or may relay the sensor information to a remote device or other processing resources for derivation of the second or additional navigation solutions. Alternatively, the first device may directly communicate sensor data and/or other navigation information to the remote device to derive the second or additional navigation solutions. Thus, as used herein, the term "navigation system" means either a self-contained device or a portable device used in conjunction with one or more additional devices.

In this context, FIG. 1 schematically illustrates an embodiment of device 100 that is self-contained, and includes MPU 102, host processor 104, host memory 106, and, optionally, external sensor 108. Host processor 104 may be configured to perform the various computations and operations involved with five general function of device 100. Host processor 104 may be coupled to MPU 102 through bus 110, which may be any suitable bus or interface, such as a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, or other equivalent. Host memory 106 may include programs, drivers or other data that utilize information provided by MPU 102. Exemplary details regarding suitable configurations of host processor 104 and MPU 102 may be found in co-pending, commonly owned U.S. patent application Ser. No. 12/106,921, filed Apr. 21, 2008, which is hereby incorporated by reference in its entirety.

In this embodiment, MPU 102 is shown to include sensor processor 112, memory 114 and internal sensor 116. As desired, inertial sensor 116 may be implemented using Micro Electro Mechanical System (MEMS) to be integrated with MPU 106 in a single package. In one embodiment, internal sensor 116 may include rotational motion sensors or linear motion sensors. For example, the rotational motion sensors may be gyroscopes to measure angular velocity along one or more orthogonal axes and the linear motion sensors may be accelerometers to measure linear acceleration along one or more orthogonal axes. In one aspect, three gyroscopes and three accelerometers may be employed, such that a sensor fusion operation performed by sensor processor 112, or other processing resources of device 100, combines data from internal sensor 116 to provide a six axis determination of motion. Further, external sensor 108 may represent one or more sensors as described above, such as an accelerometer and/or a gyroscope, that outputs data for measuring motion of the user, or may represent any other device for sensing the surrounding environment. For example, a barometer and/or a magnetometer may be used to refine position determinations made using internal sensor 116. In one embodiment, external sensor 108 may include a magnetometer measuring along three orthogonal axes and outputting data to be fused with the gyroscope and accelerometer inertial sensor data to provide a nine axis determination of motion. In another embodiment, external sensor 108 may also include a barometer to provide an altitude determination that may be fused with the other sensor data to provide a ten axis determination of motion. Although described in the context of one or more sensors being MEMS based, the techniques of this disclosure may be applied to any sensor design or implementation.

Exemplary details regarding suitable configurations of host processor 102 and MPU 106 may be found in co-pending, commonly owned U.S. patent application Ser. No. 11/774,488, filed Jul. 6, 1007, and Ser. No. 12/106,021, filed Apr. 11, 1008, which are hereby incorporated by reference in their entirety. Suitable implementations for MPU 102 in device 100 are available from InvenSense, Inc. of Sunnyvale, Calif.

Memory 114 may store algorithms, routines or other instructions for processing data output by sensor 116 or sensor 108 as well as raw data and motion data. Internal sensor 116 may include one or more sensors, such as accelerometers, gyroscopes, magnetometers, pressure sensors, microphones and other sensors. Likewise, external sensor 108 may include one or more sensors, such as accelerometers, gyroscopes, magnetometers, pressure sensors, microphones, cameras, proximity, and ambient light sensors, and temperature sensors among others sensors. As used herein, an internal sensor refers to a sensor implemented using the MEMS techniques described below for integration with an MPU into a single chip. Similarly, an external sensor as used herein refers to a sensor carried on-board the device that is not integrated into a MPU.

In some embodiments, the sensor processor 112 and internal sensor 116 are formed on different chips and in other embodiments; they reside on the same chip. In yet other embodiments, a sensor fusion algorithm that is employed in calculating orientation of device is performed externally to the sensor processor 112 and MPU 102, such as by host processor 104. In still other embodiments, the sensor fusion is performed by MPU 102. More generally, device 100 incorporates MPU 102 as well as host processor 104 and host memory 106 in this embodiment.

As will be appreciated, host processor 104 and/or sensor processor 112 may be one or more microprocessors, central processing units (CPUs), or other processors which run software programs for device 100 or for other applications related to the functionality of device 100. For example, different software application programs such as menu navigation software, games, camera function control, navigation software, and phone or a wide variety of other software and functional interfaces can be provided. In some embodiments, multiple different applications can be provided on a single device 100, and in some of those embodiments, multiple applications can run simultaneously on the device 100. In some embodiments, host processor 104 implements multiple different operating modes on device 100, each mode allowing a different set of applications to be used on the device and a different set of activities to be classified. As used herein, unless otherwise specifically stated, a "set" of items means one item, or any combination of two or more of the items.

Multiple layers of software can be provided on a computer readable medium such as electronic memory or other storage medium such as hard disk, optical disk, flash drive, etc., for use with host processor 104 and sensor processor 112. For example, an operating system layer can be provided for device 100 to control and manage system resources in real time, enable functions of application software and other layers, and interface application programs with other software and functions of device 100. A motion algorithm layer can provide motion algorithms that provide lower-level processing for raw sensor data provided from the motion sensors and other sensors, such as internal sensor 116 and/or external sensor 108. Further, a device driver layer may provide a software interface to the hardware sensors of device 100.

Some or all of these layers can be provided in host memory 106 for access by host processor 104, in memory 114 for access by sensor processor 112, or in any other suitable architecture. For example, in some embodiments, host processor 104 may execute stored instructions in the form of navigation module 118 for providing a first navigation solution using motion sensor data from internal sensor 116 and/or external sensor 108. Further, in some embodiments navigation module 118 may also derive at least a second navigation solution. Navigation module 118 may employ inertial navigation techniques utilizing sensor data, such as from internal sensor 116 and/or external sensor 108. Such techniques may involve dead reckoning or the like, and may determine an orientation for device 100, including values such as any roll, pitch, and azimuth (heading) angles.

As noted, whether derived by portable device 100 or by an auxiliary device, the first, second and any additional navigation solutions may represent complete or partial navigation solutions and/or may be relatively more or less accurate. In an embodiment, the first navigation solution represents a first set of processing conditions and the second navigation solution represents a second set of processing conditions, such that the first set of processing conditions involves a reduced expenditure of resources as compared to the second set of processing conditions.

In other embodiments, other divisions of processing may be apportioned between the sensor processor 112 and host processor 104 as is appropriate for the applications and/or hardware used, where some of the layers (such as lower level software layers) are provided in MPU 102, so that the first navigation solution is derived under a first set of processing conditions and at least the second navigation solution is derived under a second set of processing conditions. However, as noted, the different processing conditions may also represent different sources of available power, such as when portable device 100 is batter powered or charging, or different amounts of time for processing, such as when the first navigation solution is provided substantially immediately or in real time and when the second or other navigation solutions are provided subsequently. Alternatively, or in addition, the functions associated with navigation module 118 may include software code, hardware, firmware or any suitable combination and may be implemented in one or more additional devices. Thus, status navigation module 118 may include, without limitation, application software, firmware, resident software, microcode, etc., such as in the form of a computer program product accessible from a computer-usable or computer-readable medium providing program code for use by or in connection with a computer or any instruction execution system. For the purposes of this description, a computer-usable or computer-readable medium may be any apparatus that can contain, store, communicate, propagate, or transport the program for use by or in connection with the instruction execution system, apparatus, or device.

Device 100 may also include one or more communication modules 120 for establishing a communications link, which may employ any desired wired or wireless protocol, including without limitation WiFi®, cellular-based mobile phone protocols such as long term evolution (LTE), BLUETOOTH®, ZigBee®, ANT, Ethernet, peripheral component interconnect express (PCIe) bus, Inter-Integrated Circuit (I2C) bus, universal serial bus (USB), universal asynchronous receiver/transmitter (UART) serial bus, advanced microcontroller his architecture (AMBA) interface, serial digital input output (SDIO) bus and the like.

Still further, device 100 may include a source of absolute navigation information 122 to provide any desired degree of location awareness capabilities. Representative technologies that may be embodied by navigational module 122 include reference-based techniques such as the global positioning system (GPS), global navigation satellite system (GLONASS), Galileo and Beidou, as well as WiFi™ positioning, cellular tower positioning, Bluetooth™ positioning beacons, or other similar methods. Navigational module 122 may also be configured to use information from a wireless communication protocol to provide a position determination using signal trilateration. Any suitable protocol, including cellular-based and wireless local area network (WLAN) technologies such as Universal Terrestrial Radio Access (UTRA), Code Division Multiple Access (CDMA) networks, Global System for Mobile Communications (GSM), the Institute of Electrical and Electronics Engineers (IEEE) 802.10 (WiMAX), Long Term Evolution (LTE), IEEE 802.11 (WiFi™) and others may be employed.

Figure 2A:
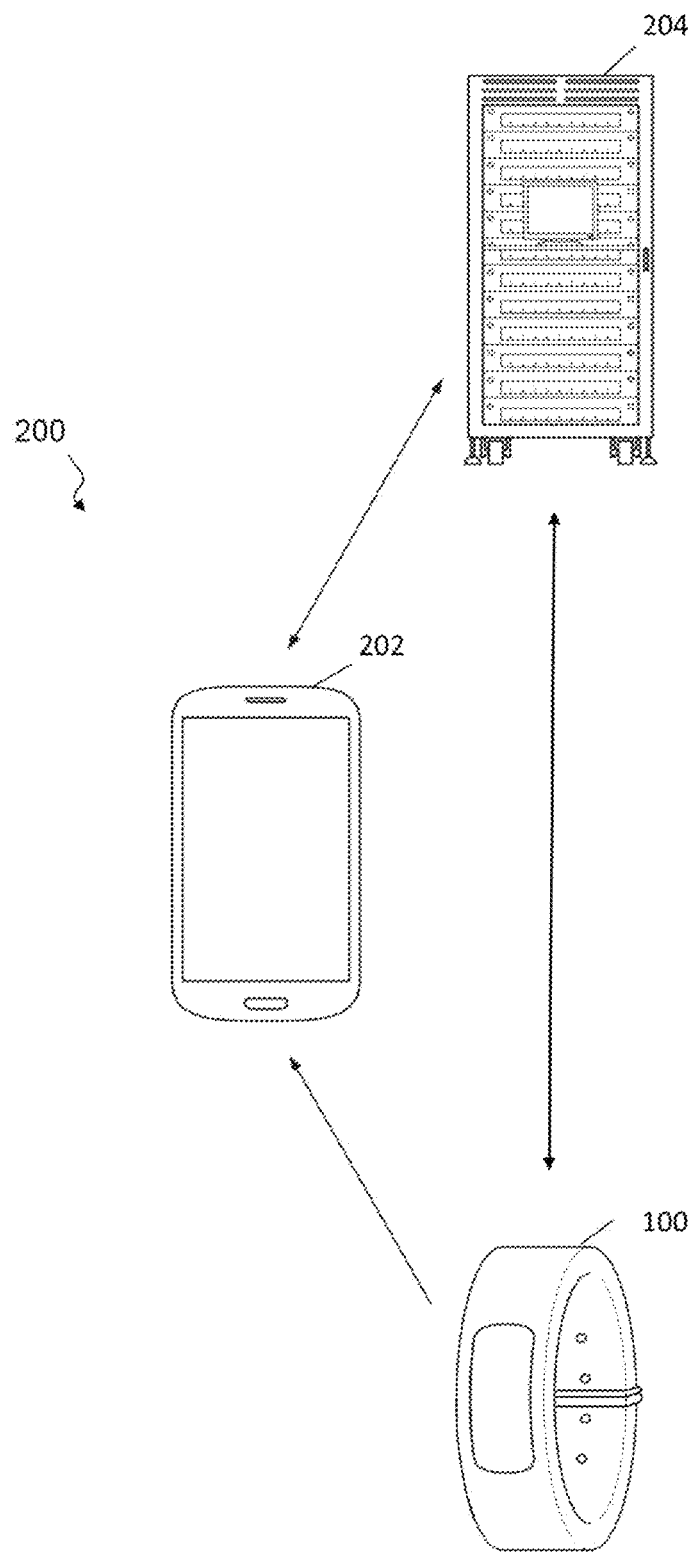
FIGS. 2A, 2B and 2C are schematic diagrams of systems for providing a plurality of navigation solutions according to some embodiments.
Figure 2B:
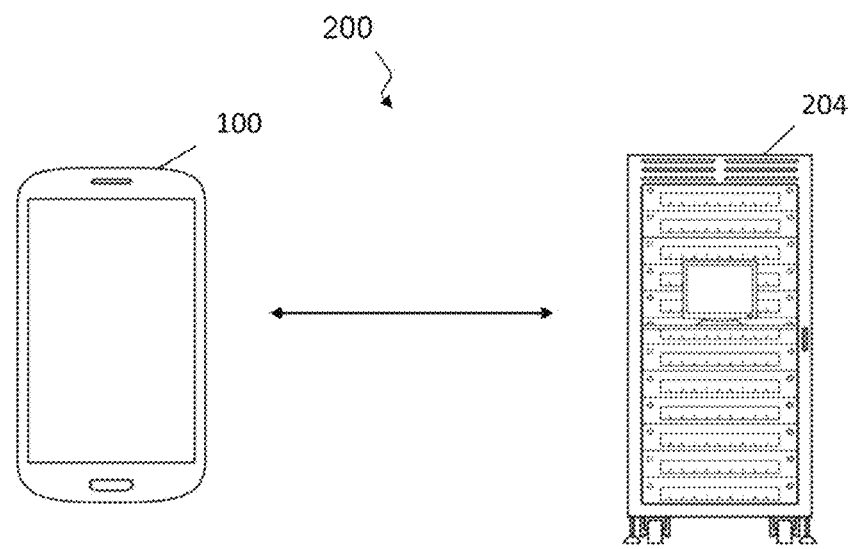
Figure 2C:
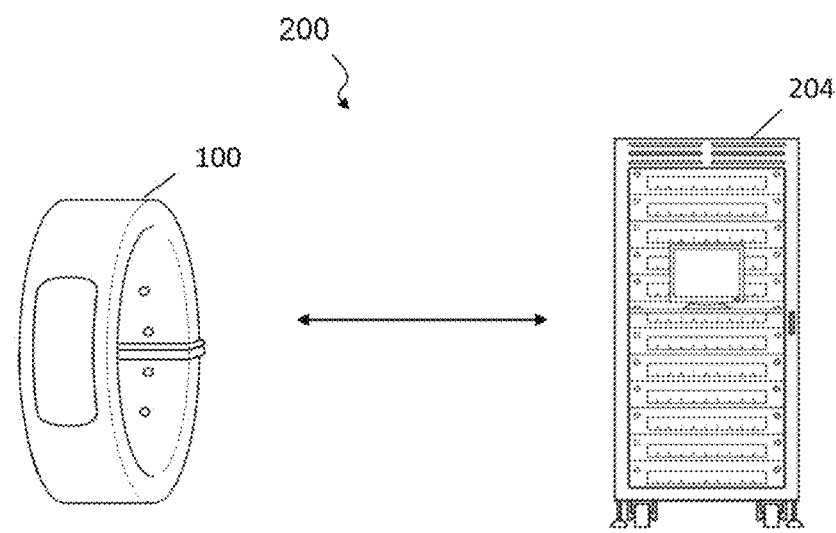

Further details regarding techniques of this disclosure may be described in the context of navigation system 200, representative examples of which are shown in FIGS. 2A, 2B and 2C. In a first example depicted in FIG. 2A, System 200 may include portable device 100 having at least one sensor for obtaining motion data that may be used to derive a first navigation solution. Portable device 100 may derive the first navigation solution itself or may communicate the sensor data to auxiliary device 202, which may derive the first (if not performed by portable device 100) and/or the second navigation solutions. In some embodiments, auxiliary device 202 may be used as a source of absolute navigational information for portable device 100, for example in cases where portable device 100 does not comprise its own source of absolute navigational information, portable device 100 may be configured as a wearable device and auxiliary device 202 may be configured as a smartphone. Alternatively or in addition, auxiliary device 202 may provide additional navigation information, such as sensor data from motion sensors (inertial sensors) or other types of sensors, including without limitation a barometer and/or magnetometer, to be used at least in deriving one of the navigation solutions. For example, auxiliary device 202 may employ any aspect of the architecture described for portable device 100 to obtain the additional navigation information, although any other technique may also be used. In the latter scenario there may be more than one auxiliary device, and information from motion sensors or other types of sensors from these auxiliary devices may be employed when deriving navigation solution(s). Using information from multiple devices (i.e., the portable device and one or more auxiliary devices) may help enhance the navigation solution(s), such as enhancing the accuracy of the solution(s) by leveraging the sensors information and/or absolute navigational information from multiple devices. In one example embodiment, portable device 100 may be configured as a smartphone and one or more auxiliary devices may be configured as wearables, each of which may provide supplemental information when deriving, or refining navigation solutions). Any combination of portable device 100 and auxiliary device(s) may be used in system 200 to derive a plurality of navigation solutions.

Further, system 200 may include a remote server 204 to derive the second or additional navigation solution. When remote server 204 is available, auxiliary device 202 may relay data from portable device 100 or its own data to the server 204, or portable device 100 may communicate directly with server 204, obviating the need for auxiliary device 202 unless used to derive one of the navigation solutions or to provide additional sensors readings or absolute navigation information. In this first example depicted in FIG. 2A, and by way of example, either portable device 100 or auxiliary device 202, may be smartphone, wearable, or any other type of portable devices. For example, when portable device 100 is a smartphone or another device having similar capabilities as indicated in FIG. 2B, it may derive the first navigation solution find transmit information including sensor data to server 204 for derivation of the second navigation solution. Likewise, when portable device 100 is configured as a wearable device and has sufficient communication capabilities, it may exchange information directly with server 204 as indicated in FIG. 2C. As noted above, in some embodiments, portable devices (e.g., smartphones) having suitable capabilities may derive both the first and second navigation solutions. One or both of auxiliary device 202 and server 204 may include navigation modules analogous to navigation module 118, with associated processing and memory resources, to use motion sensor data from portable device 100, auxiliary device(s) 202, or all devices associated with the user to derive the first, second or additional navigation solutions. As desired, any of the navigation solutions may be aided or supplemented with absolute navigation information when available.

As discussed above, in some embodiments the first navigation solution is derived using a first set of processing conditions that represents reduced resource expenditure as compared to the second set of processing conditions used to derive the second (or additional) navigation solutions. For example, the first set of processing conditions may represent a causal technique and may use less memory, consume less power, require fewer instruction cycles, require less hardware or less complex hardware, or any combination of these or similar attributes. Correspondingly, the second set of processing conditions may user more memory, consume more power, require more instruction cycles, require more hardware or more complex hardware, or any combination of these or similar attributes, and may represent a causal or non-causal technique as desired. As an illustration, the second set of processing conditions may involve post-processing techniques, such as backward smoothing, multi-pass processing and others. Notably, the second set of processing conditions may also have more information available to derive the navigation solution. In addition to the motion sensor or inertial sensors data, and the absolute navigation information if available, map or other geographic information may be available to allow for map matching, map constraining, or other techniques to be applied. These techniques may be causal or non-causal. An accurate altitude profile may also be generated, depending on the available information. Any suitable source of additional navigational information may be used when deriving the second navigational solution. In one exemplary embodiment, the first navigation solution may provide a partial solution, such as distance traveled and/or speed while the second navigation solution may provide a full solution, such as position, velocity and attitude. Generally, the second navigation solution is refined with respect to the first navigation solution. As used herein, the term "refined" means a navigation solution that is more complete, has a greater range of information, is more accurate, and/or is enhanced or improved in any manner.

It may be desirable to trigger certain operations of navigation system 200 based on one or more criteria. For example, portable device 100 may derive the first navigation solution in real-time or near real-time and, in embodiments where portable device 100 also derives the second navigation solutions, may defer the associated processing until greater resources are available, such as when portable device 100 is accessing an external power source for charging. Alternatively or in addition, portable device 100 may perform the processing associated with deriving the second navigation solution in the background without interfering with other operations that portable device 100 may be performing. Similarly, portable device 100 may be configured to wait until charging or until an adequate communications link is available to transmit sensor data to auxiliary device 202 or server 204.

By providing the subsequent second navigation solution that is more refined, additional benefits may be realized. For example, a more resource intensive set of processing conditions may be able to use motion sensor data from portable device 100, optionally with the additional types of information noted above, to bridge any gaps in the source of absolute navigation information. Accordingly, a substantially complete navigation solution and/or a more accurate navigation solution may be provided as the second navigation solution even when periods of unavailability of the source of absolute navigation information exist. As will be appreciated, this may facilitate operations indoors, in urban canyons, or in outdoor environments when wireless signal reception may be compromised or other conditions exist that interfere with the source of absolute navigation information.

Further, an aspect of the first navigation solution using the first set of processing conditions is the potential conservation of resources. Notably, portable device 100 may be battery powered and therefore have a limited source of energy. Given the ability of the second navigation solution to bridge gaps in the source of absolute navigation information, it may be desirable to duty cycle the source of absolute navigation information. For example, the source of absolute navigation may be operated in an active mode for a sufficient period of time to obtain at least a fix and then cycled to a power save mode interval. The length of the power save interval may be adjusted as desired to balance the conservation of power with the ability of the second navigation solution to bridge the gaps in absolute navigation information caused by the power save mode. As will be appreciated, the power save mode may be associated with any degree of reduced operational capability and corresponding power savings, including an idle mode, a partial shut off, a complete shut off or the like. The duty cycle of the source of absolute navigational information may be adjusted, at least in part, on an estimated quality of the first navigation solution. Alternatively or in addition, the duty cycle of the source of absolute navigational information may be adjusted, at least in part, on an estimated quality of the absolute navigation information, as a more accurate fix may allow a relatively longer power save interval. Also alternatively or in addition, the duty cycle of the source of absolute navigational information may be adjusted, at least in part, on one or more characteristics or quantities that may be derived from the first navigation solution, such as when steps are detected or when aspects of the user's motion may otherwise be characterized in a manner that facilitates derivation of the second navigation solution and reduces the need for absolute navigation information. In case sensor information from at least one auxiliary device is used in addition to sensor information from the portable device, this may be used to help enhance the navigation solution(s) (for example, the second navigation solution) and consequently may allow a relatively longer power save interval.

As desired, the second navigation solution and/or information derived from the second navigation solution may be fed back to the first set of processing conditions for use in deriving a navigation solution using subsequent sensor data. For example, information may be derived from the second navigation solution regarding human motion dynamics specific to the user, such as step length or the like. As such, the first set of processing conditions may utilize the information when deriving a navigation solution from subsequently obtained sensor data. Alternatively or in addition, the second navigation solution and/or information derived from the second navigation solution may be fed back to the portable device for any suitable purpose, such as calibration of one or more sensors.

Figure 3:
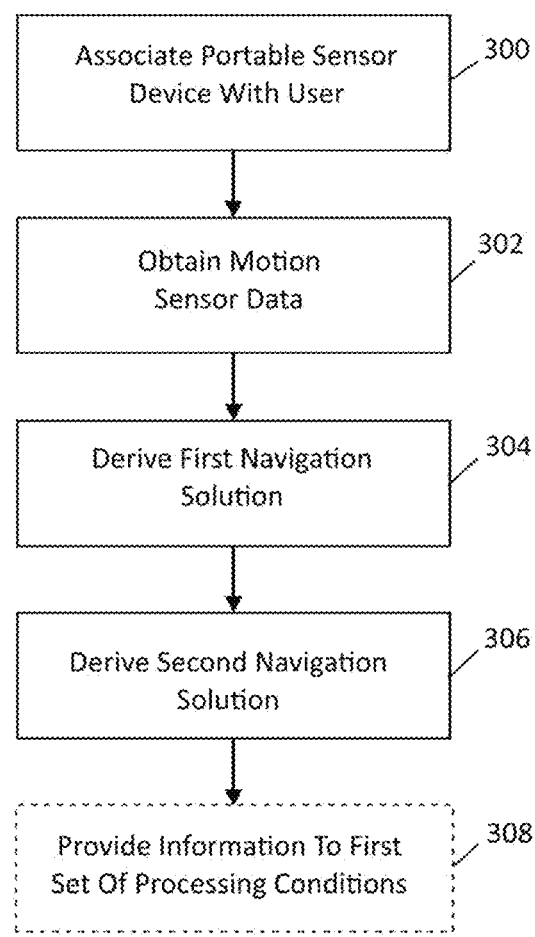
FIG. 3 is a flowchart showing a routine for providing a plurality of navigation solutions according loan embodiment.

To help illustrate aspects of this disclosure, representative operations that may be performed by navigation module 118 of portable device 100 are depicted in the flow chart of FIG. 3. Although described in the context of portable device 100, any or all of the functions described as being performed by navigation module 118 may be performed by an associated local device, such as auxiliary device 202, or by a remote device, such as server 204. Beginning with 300, a portable sensor device, such as device 100, may be associated with a user or with a platform conveying the user, such that sensor data output by device 100 represents motion the user. In 302, motion sensor data may be obtained from device 100, such as from accelerometer and/or gyroscope data from internal sensor 116 or any other suitable sources of measurement, including external sensor 105. Navigation module 115 may then provide a first set of processing conditions navigation solution for deriving a first navigation solution from the motion sensor data in 304. Correspondingly, navigation module 118 may also provide a second set of processing conditions for deriving a second navigation solution in 306. As discussed above, the second navigation solution may be more refined as compared to the first navigation solution. Optionally, as indicated by 308, the second navigation solution or information derived from the second navigation solution may be fed back to the first set of processing conditions, such as for deriving a navigation solution from subsequently obtained sensor data, calibrating a sensor of portable device 100, or any other suitable purpose.

In one aspect, absolute navigational information for the portable device may be used as an aid, at least when deriving the second navigation solution, and optionally when deriving the first navigation solution, lire absolute navigational information may be obtained from any one or any combination of the following: (i) a global navigation satellite system (GNSS); (ii) cell-based positioning; (iii) WiFi-based positioning; or (iv) other wireless-based positioning. Further, the absolute navigational information may be from a source integrated with the portable sensor device or from an auxiliary device associated with the user. As desired, the source of the absolute navigational information may be duty cycled. Adjustments to the duty cycle may be based at least in part on an estimated quality of the first navigation solution, on an estimated quality of the absolute navigational information and/or on a quantity derived from the first navigation solution.

In one aspect, sensor data from at least one auxiliary device associated with the user may be obtained. The sensor data from the at least one auxiliary device may be used for at least one of: (i) deriving a first navigation solution under a first set of processing conditions; and (ii) deriving at least a second navigation solution under a second set of processing conditions, wherein the second navigation solution is refined as compared to the first navigation solution. Alternatively, the sensor data from the at least one auxiliary device together with the sensor data from the portable sensor device may be used for at least one of: (i) deriving an enhanced first navigation solution under a first set of processing conditions; and (ii) deriving at least an enhanced second navigation solution under a second set of processing conditions, wherein the second navigation solution is refined as compared to the first navigation solution.

In one aspect, the first set of processing conditions may represent a reduced expenditure of resources as compared to the second set of processing conditions. For example, the reduced expenditure of resources may involve usage of less computational resources and/or may involve less power consumption.

In one aspect, the second navigation solution may be more complete than the first navigation solution. For example, the first navigation solution may include distance and speed of the user and/or the second navigation solution may include a route traversed by the user.

In one aspect, the second navigation solution is more accurate than the first navigation solution.

In one aspect, the first navigation solution may be provided in real time and the second navigation solution may be provided subsequent to the first navigation solution.

In one aspect, the second processing of the sensor data may be performed locally with respect to the portable sensor device. For example, the second processing of the sensor data may be performed by the portable sensor device or may be performed by an auxiliary device associated with the user.

In one aspect, the sensor data may be transmitted to remote processing resources so that the second processing of the sensor data is performed remotely. The sensor data may be transmitted to the remote processing resources by the portable sensor device or may be transmitted to the remote processing resources by an auxiliary device associated with the user.

In one aspect, the second processing of the sensor data may include multi-pass processing.

In one aspect, the second processing of the sensor data may include backward smoothing.

In one aspect, the second processing of the sensor data may include using an additional source of navigation information.

In one aspect, the second processing of the sensor data may include map matching.

In one aspect, information derived from the second navigation solution may be provided to the portable sensor device. Subsequent sensor data may be processed under the first set of processing conditions using the information derived from the second navigation solution. The information derived from the second navigation solution may include human motion dynamics specific to the user. Alternatively or in addition, a sensor of the portable sensor device may be calibrated based at least in part on the information derived from the second navigation solution.

In one aspect, the sensor data may include motion sensor data. The sensor data may also include pressure sensor data and, if desired, the second processing of the sensor data may include matching an altitude profile.

As noted, a system for providing a plurality of navigation solutions may include a portable sensor device associated with a user outputting sensor data indicative of movement of the user, a first set of processing conditions configured to derive a first navigation solution using the sensor data and a second set of processing conditions configured to derive a second navigation solution using the sensor data, wherein the second navigation solution may be refined as compared to the first navigation solution.

In one aspect, a source of absolute navigational information for the portable sensor device may be provided, wherein at least the second set of processing conditions may be further configured to use the absolute navigational information to aid derivation of at least the second navigation solution. The absolute navigational information may be obtained from any one or any combination of the following: (i) a global navigation satellite system (GNSS); (ii) cell-based positioning; (iii) WiFi-based positioning; or (iv) other wireless-based positioning. The source of absolute navigational information may be integrated with the portable sensor device of the system may also include an auxiliary device associated with the user, wherein the source of absolute navigational information may be from the auxiliary device. The source of the absolute navigational information may be configured to be duty cycled.

In one aspect, the system may include at least one auxiliary device associated with the user that may output sensor data. The sensor data from live at least one auxiliary device may be used for at least one of: (i) deriving a first navigation solution under a first set of processing conditions; and (ii) deriving at least a second navigation solution under a second set of processing conditions, wherein the second navigation solution is refined as compared to the first navigation solution. Alternatively, the sensor data from the at least one auxiliary device together with the sensor data from the portable sensor device may lie used for at least one of: (i) deriving an enhanced first navigation solution under a first set of processing conditions; and (ii) deriving at least an enhanced second navigation solution under a second set of processing conditions, wherein the second navigation solution is refined as compared to the first navigation solution.

In one aspect, the first set of processing conditions may represent a reduced expenditure of resources as compared to the second set of processing conditions. For example, the reduced expenditure of resources may involve usage of less computational resources and/or may involve less power consumption.

In one aspect the second navigation solution may be more complete than the first navigation solution.

In one aspect, the second navigation solution may lie more accurate than the first navigation solution.

In one aspect, the second set of processing conditions may be implemented in the portable sensor device.

In one aspect, the system may include an auxiliary device associated with the user, wherein the second set of processing conditions may be implemented in the auxiliary device.

In one aspect, the system may include remote processing resources, wherein the second set of processing conditions may be implemented in the remote processing resources.

In one aspect, the portable sensor device may include a communication module to transmit the sensor data to the remote processing resources.

In one aspect, the system may include an auxiliary device associated with the user to relay the sensor data to the remote processing resources.

In one aspect, portable sensor device may include an accelerometer and a gyroscope. The accelerometer and the gyroscope may be implemented as a Micro Electro Mechanical System (MEMS).

Depending on the architecture of device 100, sensor processor 108 and inertial sensor 112 may be formed on different chips, or as shown, may reside on the same chip. A sensor fusion algorithm employed to calculate the orientation of device 100 may be performed externally to sensor processor 108 and MPU 106, such as by host processor 104, or may be performed by MPU 106. A chip may be defined to include at least one substrate typically formed from a semiconductor material. A single chip may be formed from multiple substrates, where the substrates are mechanically bonded to preserve the functionality. A multiple chip includes at least two substrates, wherein the two substrates are electrically connected, but do not require mechanical bonding. A package provides electrical connection between the bond pads on the chip to a metal lead that can be soldered to a PCB. A package typically comprises a substrate and a cover. Integrated Circuit (IC) substrate may refer to a silicon substrate with electrical circuits, typically CMOS circuits.

One or more sensors may be incorporated into the package if desired using any suitable technique. In some embodiments, a sensor may be MEMS-based, such that a MEMS cap provides mechanical support for the MEMS structure. The MEMS structural layer is attached to the MEMS cap. The MEMS cap is also referred to as handle substrate or handle water. In some embodiments, the first substrate may be vertically stacked, attached and electrically connected to the second substrate in a single semiconductor chip, while in other embodiments, the first substrate may be disposed laterally and electrically connected to the second substrate in a single semiconductor package. In one embodiment, the first substrate is attached to the second substrate through wafer bonding, as described in commonly owned U.S. Pat. No. 7,104,129, which is incorporated herein by reference in its entirety, to simultaneously provide electrical connections and hermetically seal the MEMS devices. This fabrication technique advantageously enables technology that allows for the design and manufacture of high performance, multi-axis, inertial sensors in a very small and economical package. Integration at the wafer-level minimizes parasitic capacitances, allowing for improved signal-to-noise as compared to a discrete solution. Such integration at the wafer-level also enables the incorporation of a rich feature set which minimizes the need for external amplification.

The techniques of this disclosure may be combined with any navigation solution independent of the type of the state estimation or filtering technique used in this navigation solution. The state estimation technique can be linear, non-linear or a combination thereof. Different examples of techniques used in the navigation solution may rely on a Kalman filter, an Extended Kalman filter, a non-linear filter such as a particle filter, or an artificial intelligence technique such as Neural Network or Fuzzy systems. The state estimation technique used in the navigation solution can use any type of system and/or measurement models. The navigation solution may follow any scheme for integrating the different sensors and systems, such as for example loosely-coupled integration scheme or tightly coupled integration scheme among others. The navigation solution may utilize modeling (whether with linear or nonlinear, short memory length or long memory length) and/or automatic calibration for the errors of inertial sensors and/or the other sensors used.

EXAMPLES

To help demonstrate the techniques of this disclosure, sample navigation solutions were derived for reference paths in various environments. During the tests, a wearable device in the form of a watch was used to gather the motion sensor data while absolute navigation information, using GNSS, was provided by a smartphone and sent to the watch using a Bluetooth™ wireless connection. As discussed above, this represents only one potential configuration of a system for deriving a plurality of navigation solutions. In other embodiments, the source of absolute navigation information may be collocated with the motion sensors. Further, the first and second processing conditions may be implemented in one or more devices. In view of the following results, it will be appreciated that a number of benefits are provided by following the teachings of this disclosure, including the derivation of a refined navigation solution that may be more accurate or represent other improvement for example by providing more accurate speed and distance travel information. Additionally, the techniques of this disclosure also offer reduced power consumption by duty cycling the source of absolute navigation information. Still further, the use of second processing conditions allows for post-processing techniques to be applied.

Figure 4:
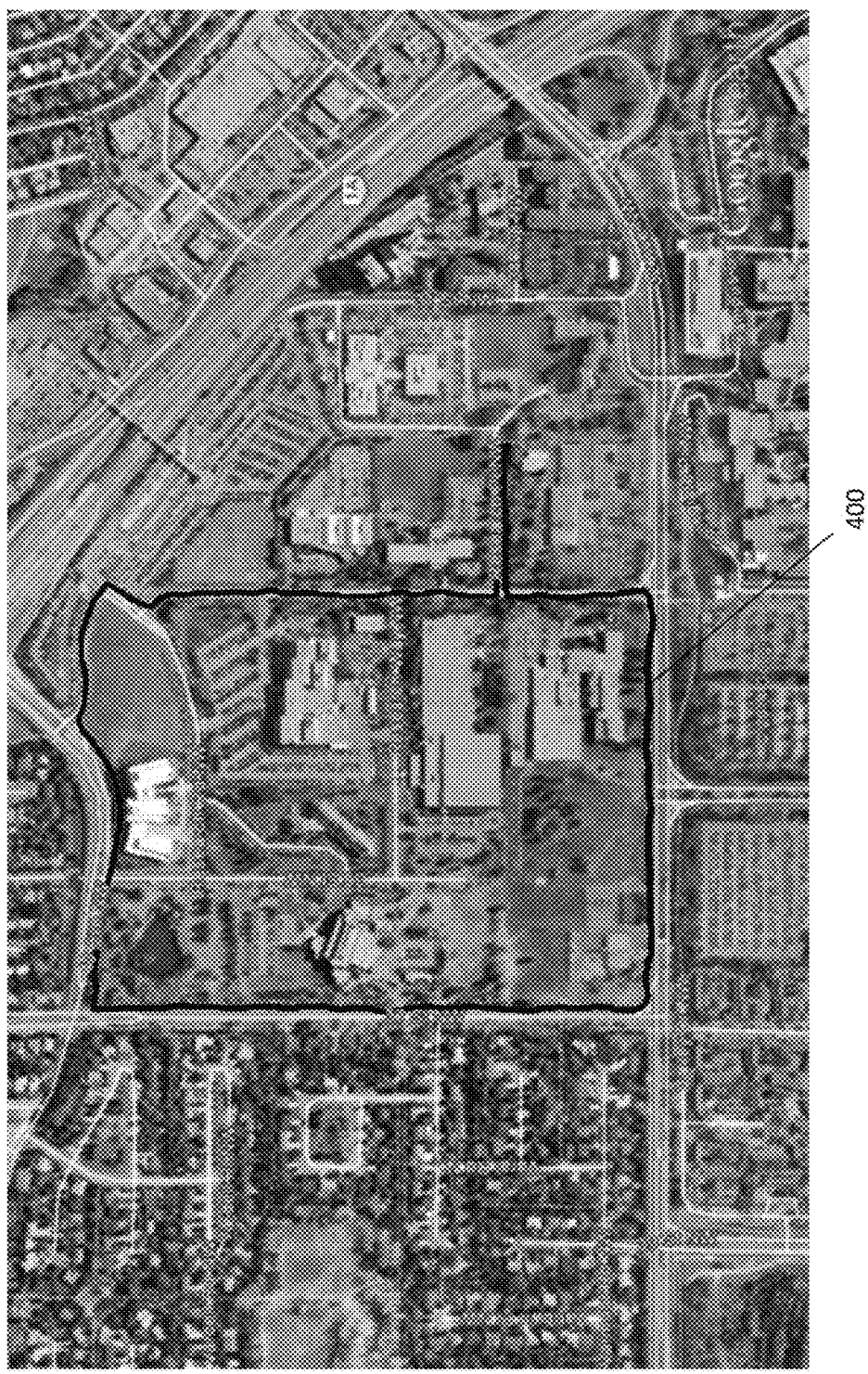
FIG. 4 is a schematic representation of a reference path in an outdoor environment according to an embodiment.

In a first example, a reference path was followed in a relatively open outdoor environment as graphically illustrated in FIG. 4. Trace 400 indicates the reference path that was followed while conducting the tests that provided the results shown in FIGS. 5-10.

Figure 5:
FIG. 5 is a schematic representation of a navigation solution derived under second processing conditions and absolute navigation information from a source being operated at a 50% duty cycle while following the reference path of FIG. 4 according to an embodiment.
Figure 6:
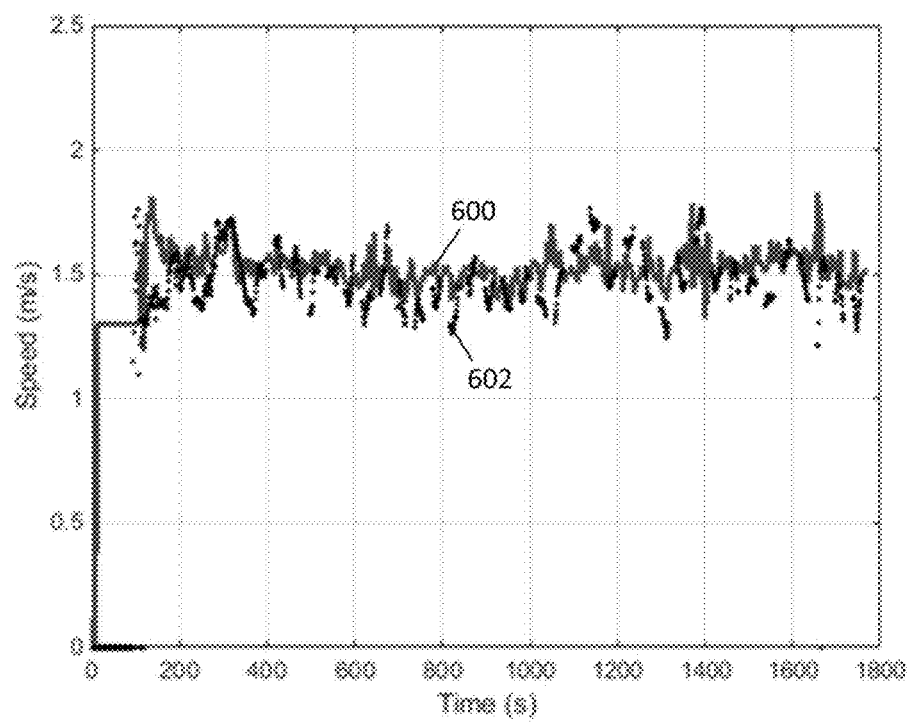
FIG. 6 is a graphical representation of speed information from the navigation solution of FIG. 5 according to an embodiment.
Figure 7:
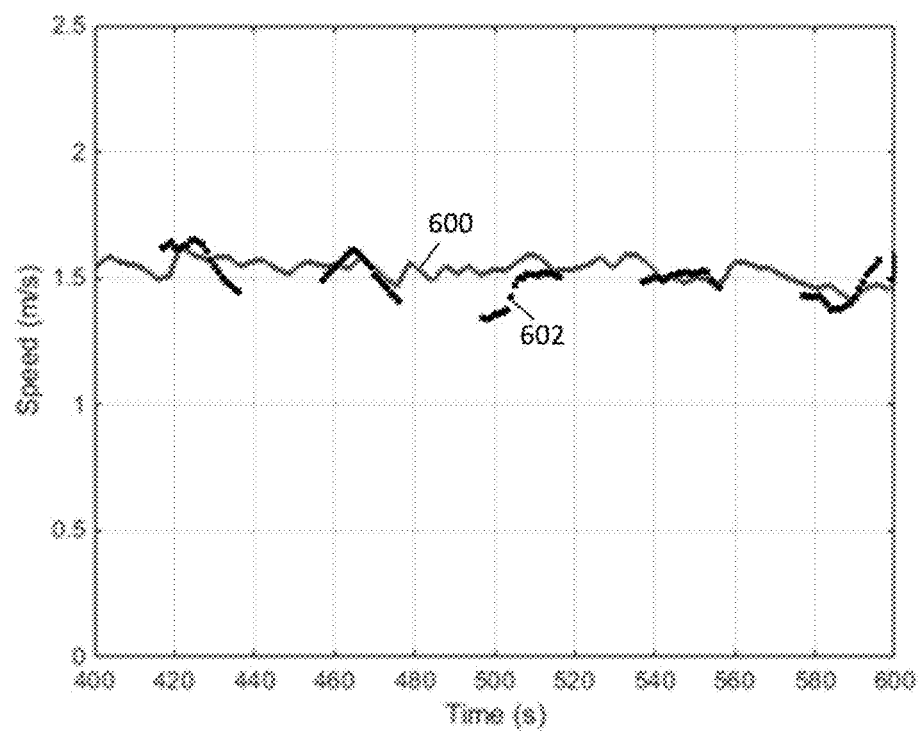
FIG. 7 is a detailed view of a portion of the speed information shown in FIG. 6.

One test was conducted while the source of absolute navigation information was duty cycled at 50%. As shown in FIG. 5, trace 500 indicates the navigation solution derived under second processing conditions using the absolute navigation information, and the stacked triangles 502 indicate the absolute navigation information including its heading. A detailed view corresponding to the upper right corner of reference path 400 is shown in the inset to the right. As will be appreciated, the navigation solution represented by trace 500 is substantially continuous while the absolute navigation information is discontinuous and periodic, corresponding to the selected duty cycle. In this test, the source of absolute navigation information was operated continuously during a first portion of the path for initialization purposes, but in other embodiments, duty cycling may be initiated at any point during the derivation of the navigation solution, including at the beginning. The speed information from the navigation solution is graphically represented in FIG. 6 as trace 600, while the speed from absolute navigation is represented by dots 602. A detailed view of a portion of this speed information is shown in FIG. 7. As will be appreciated, the speed from the derived navigation solution provides continuous speed information, even though the absolute navigation information is interrupted by the duty cycle.

Figure 8:
FIG. 8 is a schematic representation of a navigation solution derived under second processing conditions and absolute navigation information from a source being operated at a 25% duty cycle while following the reference path of FIG. 4 according to an embodiment.
Figure 9:
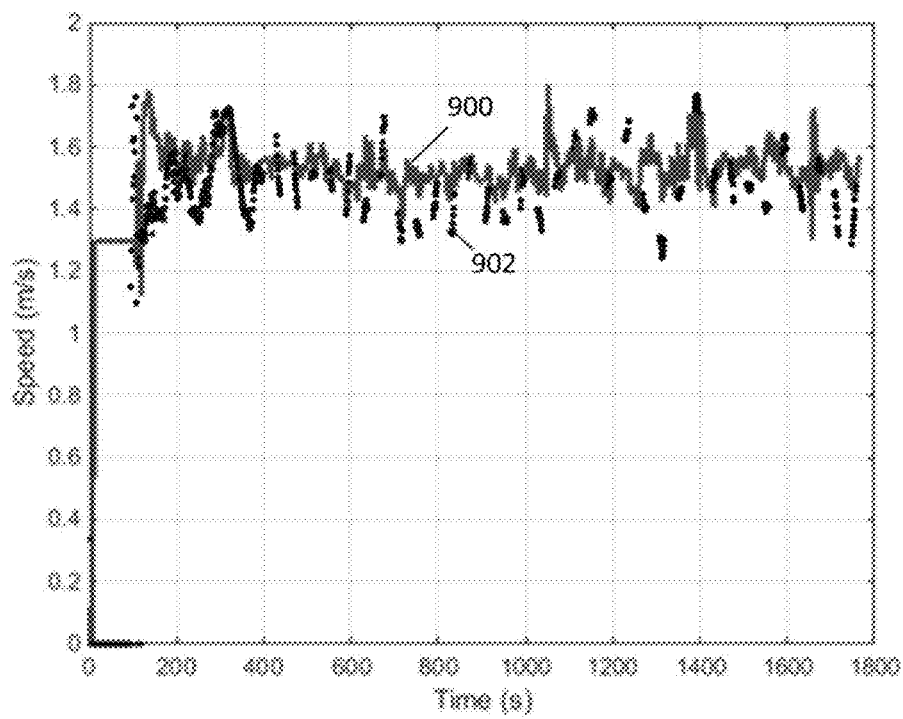
FIG. 9 is a graphical representation of speed information from the navigation solution of FIG. 8 according to an embodiment.
Figure 10:
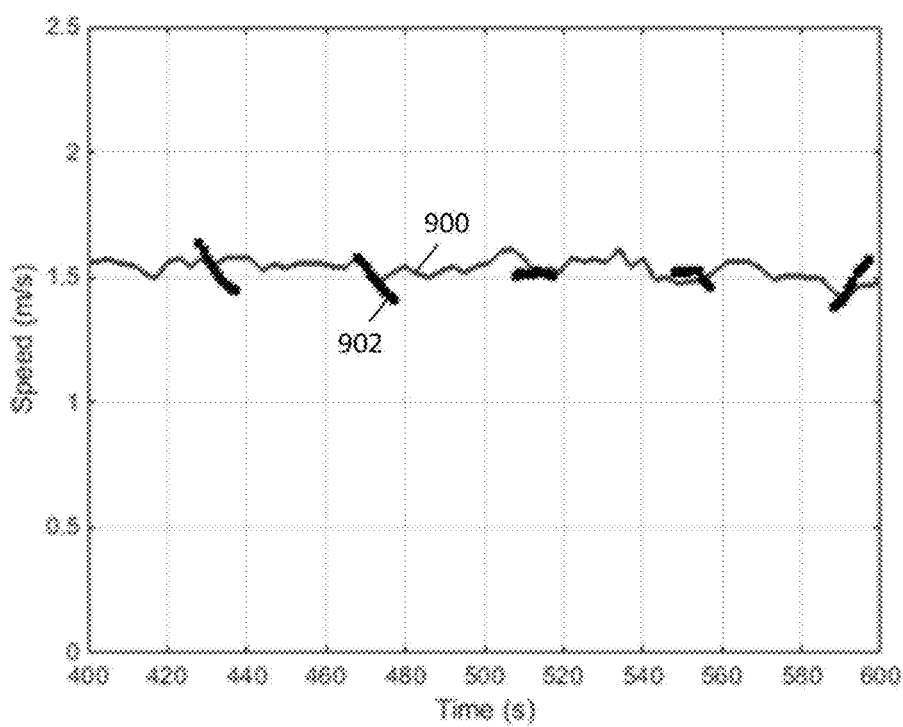
FIG. 10 is a detailed view of a portion of the speed information shown in FIG. 9.

Another test was conducted while the source of absolute navigation information was duty cycled at 25%. As shown in FIG. 8, trace 800 indicates the navigation solution derived tinder second processing conditions using the absolute navigation information, and the stacked triangles 802 indicate the absolute navigation information including its heading. Again, a detailed view is shown in the inset to the right. As with the previous test, the navigation solution represented by trace 800 is substantially continuous while the absolute navigation information is discontinuous and periodic, corresponding to the selected duty cycle. Likewise, the speed information from the navigation solution is graphically represented in FIG. 9 as trace 900, while the speed from absolute navigation is represented by dots 902. A detailed view of a portion of this speed information is shown in FIG. 10. Once more, the speed from the derived navigation solution provides continuous speed information, even though the absolute navigation information is interrupted by the duty cycle.

Figure 11:
FIG. 11 is a schematic representation of a reference path in another outdoor environment according to an embodiment.
Figure 12:
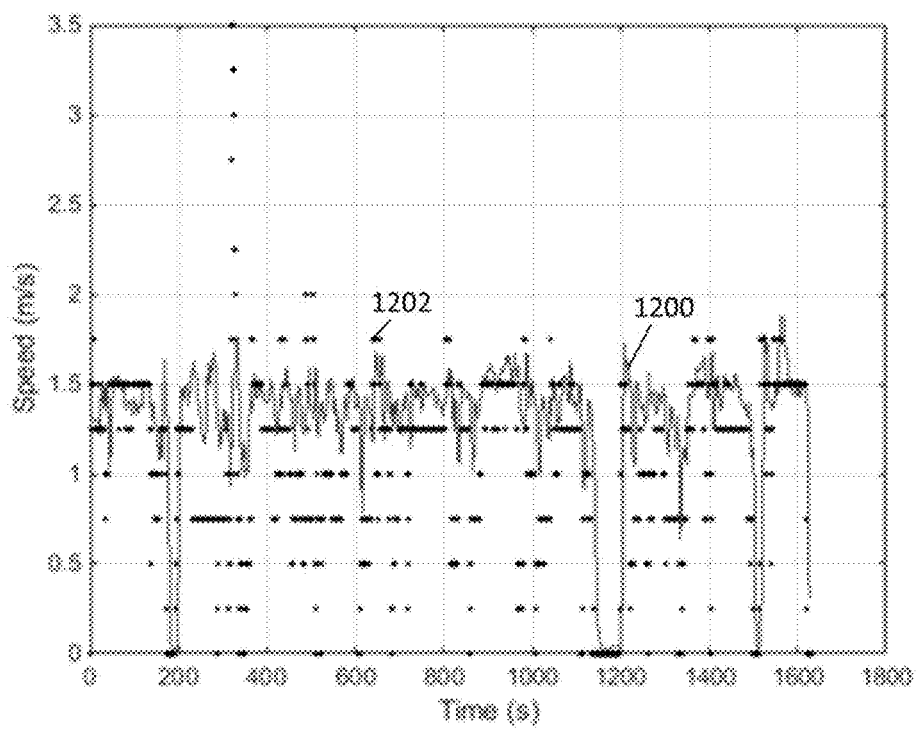
FIG. 12 is a graphical representation of speed information front a navigation solution derived under second processing conditions while following the reference path of FIG. 11 according to an embodiment.
Figure 13:
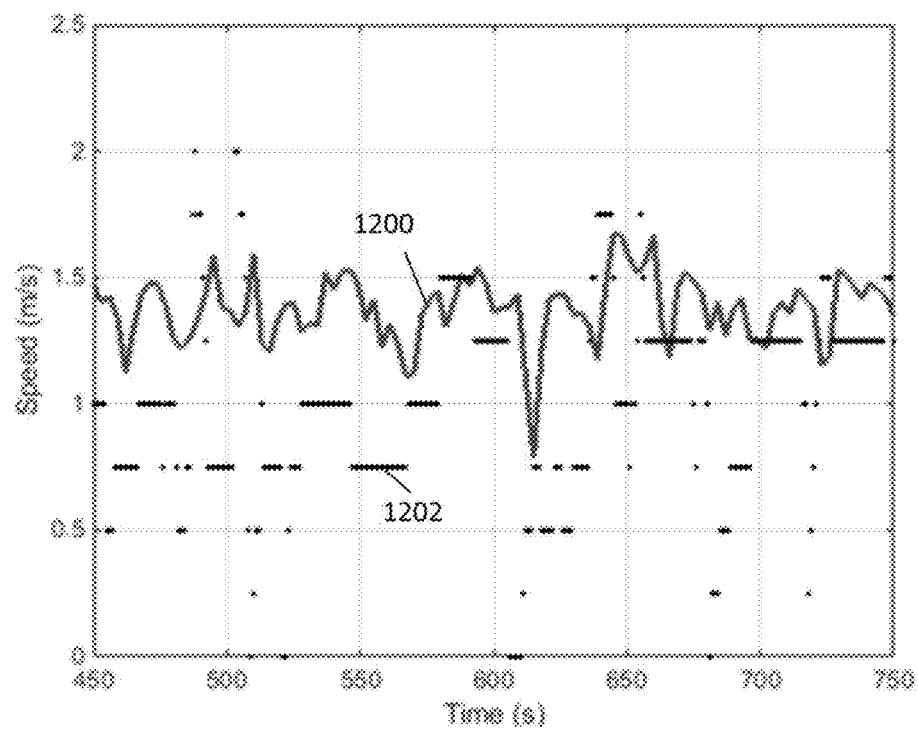
FIG. 13 is a detailed view of a portion of the speed information shown in FIG. 12.

Further tests were conducted following a reference path in a relatively obstructed outdoor environment (i.e. where absolute navigation information is degraded or denied), under a condition typically termed an "urban canyon." The height of surrounding buildings may interfere with GNSS reception and result in reduced performance. The reference path used for these tests is shown as path 1100 in FIG. 11. A graphical representation of speed information from the derived navigation solution while following the reference path of FIG. 11 is shown in FIG. 12, where the speed information from the navigation solution is graphically represented as trace 1200 and the speed from absolute navigation is represented by dots 1202. Periods of zero speed correspond to times when the test user was stopped at pedestrian crosswalks. A detailed view of a portion of the speed information shown in FIG. 12 is depicted in FIG. 13. Despite the relatively reduced quality of information provided by the source of absolute navigation information, the speed information from the navigation solution may be seen to be continuous and more accurate.

Contemplated Embodiments

The present disclosure describes the body frame to be x forward, y positive towards right side of the body and z axis positive downwards. It is contemplated that any body-frame definition can be used for the application of the method and apparatus described herein.

It is contemplated that the techniques of this disclosure can be used with a navigation solution that may optionally utilize automatic zero velocity periods or static period detection with its possible updates and inertial sensors bias recalculations, non-holonomic updates module, advanced modeling and/or calibration of inertial sensors errors, derivation of possible measurements updates for them from GNSS when appropriate, automatic assessment of GNSS solution quality and detecting degraded performance, automatic switching between loosely and tightly coupled integration schemes, assessment of each visible GNSS satellite when in tightly coupled mode, and finally possibly can be used with a backward smoothing module with any type of backward smoothing technique and either running in post mission or in the background on buffered data within the same mission.

It is further contemplated that techniques of this disclosure can also be used with a mode of conveyance technique or a motion mode detection technique to establish the mode of conveyance. This enables the detection of pedestrian mode among other modes such as for example driving mode. When pedestrian mode is detected, the method presented in this disclosure can be made operational to determine the misalignment between the device and the pedestrian.

It is further contemplated that techniques of this disclosure can also be used with a navigation solution that is further programmed to run, in the background, a routine to simulate artificial outages in the absolute navigational information and estimate the parameters of another instance of the state estimation technique used for the solution in the present navigation module to optimize the accuracy and the consistency of the solution. The accuracy and consistency is assessed by comparing the temporary background solution during the simulated outages to a reference solution. The reference solution may be one of the following examples: the absolute navigational information (e.g. GNSS); the forward integrated navigation solution in the device integrating the available sensors with the absolute navigational information (e.g. GNSS) and possibly with the optional speed or velocity readings; or a backward smoothed integrated navigation solution integrating the available sensors with the absolute navigational information (e.g. GNSS) and possibly with the optional speed or velocity readings. The background processing can run either on the same processor as the forward solution processing or on another processor that can communicate with the first processor and can read the saved data from a shared location. The outcome of the background processing solution can benefit the real-time navigation solution in its future run (i.e. real-time run after the background routine has finished running), for example, by having improved values for the parameters of the forward state estimation technique used for navigation in the present module.

It is further contemplated that the techniques of this disclosure can also be used with a navigation solution that is further integrated with maps (such as street maps, indoor maps or models, or any other environment map or model in cases of applications that have such maps or models available), and a map matching or model matching routine. Map matching or model matching can further enhance the navigation solution during the absolute navigation information (such as GNSS) degradation or interruption. In the case of model matching, a sensor or a group of sensors that acquire information about the environment can be used such as, for example, Laser range finders, cameras and vision systems, or sonar systems. These new systems can be used either as an extra help to enhance the accuracy of the navigation solution during the absolute navigation information problems (degradation or absence), or they can totally replace the absolute navigation information in some applications.

It is further contemplated that the techniques of this disclosure can also be used with a navigation solution that, when working either in a tightly coupled scheme or a hybrid loosely/tightly coupled option, need not be bound to utilize pseudorange measurements (which are calculated from the code not the carrier phase, thus they are called code-based pseudoranges) and the Doppler measurements (used to get the pseudorange rates). The carrier phase measurement of the GNSS receiver can be used as well, for example: (i) as an alternate way to calculate ranges instead of the code-based pseudoranges, or (ii) to enhance the range calculation by incorporating information from both code-based pseudorange and carrier-phase measurements; such enhancement is the carrier-smoothed pseudorange.

It is further contemplated that the techniques of this disclosure can also be used with a navigation solution that relies on an ultra-tight integration scheme between GNSS receiver and the other sensors' readings.

It is further contemplated that the techniques of this disclosure can also be used with a navigation solution that uses various wireless communication systems that can also be used for positioning and navigation either as an additional aid (which will be more beneficial when GNSS is unavailable) or as a substitute for the GNSS information (e.g. for applications where GNSS is not applicable). Examples of these wireless communication systems used for positioning are, such as, those provided by cellular phone towers and signals, radio signals, digital television signals, WiFi, or WiMax. For example, for cellular plume based applications, an absolute coordinate from cell phone towers and the ranges between the indoor user and the towers may be utilized for positioning, whereby the range might be estimated by different methods among which calculating the time of arrival or the time difference of arrival of the closest cell phone positioning coordinates. A method known as Enhanced Observed Time Difference (E-OTD) can be used to get the known coordinates and range. The standard deviation for the range measurements may depend upon the type of oscillator used in the cell phone, and cell tower timing equipment and the transmission losses. WiFi positioning can be done in a variety of ways that includes but is not limited to time of arrival, time difference of arrival, angles of arrival, received signal strength, and fingerprinting techniques, among others; all of the methods provide different level of accuracies. The wireless communication system used for positioning may use different techniques for modeling the errors in the ranging, angles, or signal strength from wireless signals, and may use different multipath mitigation techniques. All the above mentioned ideas, among others, are also applicable in a similar manner for other wireless positioning techniques based on wireless communications systems.

It is further contemplated that the techniques of this disclosure can also be used with a navigation solution that utilizes aiding information from other moving devices. This aiding information can be used as additional aid (that will be more beneficial when GNSS is unavailable) or as a substitute for the GNSS information (e.g. for applications where GNSS based positioning is not applicable). One example of aiding information from other devices may be relying on wireless communication systems between different devices. The underlying idea is that the devices that have better positioning or navigation solution (for example having GNSS with good availability and accuracy) can help the devices with degraded or unavailable GNSS to get an improved positioning or navigation solution. This help relies on the well-known position of the aiding device(s) and the wireless communication system for positioning the device(s) with degraded or unavailable GNSS. This contemplated variant refers to the one or both circumstances) where: (i) the devices) with degraded or unavailable GNSS utilize the methods described herein and get aiding from other devices and communication system, (ii) the aiding device with GNSS available and thus a good navigation solution utilize the methods described herein. The wireless communication system used for positioning may rely on different communication protocols, and it may rely on different methods, such as for example, time of arrival, time difference of arrival, angles of arrival, and received signal strength, among others. The wireless communication system used for positioning may use different techniques for modeling the errors in the ranging and/or angles from wireless signals, and may use different multipath mitigation techniques.

The embodiments and techniques described above may be implemented in software as various interconnected functional blocks or distinct software modules. This is not necessary, however, and there may be cases where these functional blocks or modules are equivalently aggregated into a single logic device, program or operation with unclear boundaries. In any event, the functional blocks and software modules implementing the embodiments described above, or features of the interface can be implemented by themselves, or in combination with other operations in either hardware or software, either within the device entirely, or in conjunction with the device and other processor enabled devices in communication with the device, such as a server.

Although a few embodiments haw been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the disclosure is defined and limited only by the claims that follow.

What is claimed is:

1. A method for providing a plurality of navigation solutions comprising:
   a) providing a portable sensor device associated with a user;
   b) obtaining sensor data from the portable sensor device indicative of movement of the user;
   c) deriving a first navigation solution using the obtained sensor data under a first set of processing conditions; and
   d) deriving at least a second navigation solution using the obtained sensor data under a second set of processing conditions, wherein the first navigation solution is provided in real time and the second navigation solution is provided at a time subsequent to the first navigation solution and wherein the second navigation solution is refined as compared to the first navigation solution such that the second navigation solution is at least one of: i) more complete than the first navigation solution and ii) more accurate than the first navigation solution with respect to at least one quantity included in both the first navigation solution and the second navigation solution.

2. The method of claim 1, further comprising obtaining absolute navigational information for the portable sensor device and using the absolute navigational information to aid the at least the second navigation solution.

3. The method of claim 2, wherein the absolute navigational information is obtained from any one or any combination of the following: (i) a global navigation satellite system (GNSS); (ii) cell-based positioning; (iii) WiFi-based positioning; or (iv) other wireless-based positioning.

4. The method of claim 3, wherein the absolute navigational information is from a source integrated with the portable sensor device.

5. The method of claim 3, wherein the absolute navigational information is from an auxiliary device associated with the user.

6. The method of claim 2, further comprising duty cycling a source of the absolute navigational information.

7. The method of claim 6, further comprising adjusting the duty cycle of the source of absolute navigational information based at least in part on at least one factor selected from the group consisting of an estimated quality of the first navigation solution; an estimated quality of the absolute navigation information; and a quantity derived from the first navigation solution.

8. The method of claim 1, wherein the method further comprises obtaining sensor data from at least one auxiliary device associated with the user.

9. The method of claim 8, wherein the method further comprises using the sensor data from the at least one auxiliary device for at least one of: (i) deriving a first navigation solution under a first set of processing conditions; and (ii) deriving at least a second navigation solution under a second set of processing conditions, wherein the second navigation solution is refined as compared to the first navigation solution.

10. The method of claim 8, wherein the method further comprises using the sensor data from the at least one auxiliary device together with the sensor data from the portable sensor device for at least one of: (i) deriving an enhanced first navigation solution under a first set of processing conditions; and (ii) deriving at least an enhanced second navigation solution under a second set of processing conditions, wherein the second navigation solution is refined as compared to the first navigation solution.

11. The method of claim 1, wherein the first set of processing conditions represents a reduced expenditure of resources as compared to the second set of processing conditions.

12. The method of claim 11, wherein the reduced expenditure of resources comprises the usage of less computational resources.

13. The method of claim 11, wherein the reduced expenditure of resources comprises less power consumption.

14. The method of claim 1, wherein the second navigation solution is more complete than the first navigation solution.

15. The method of claim 14, wherein the first navigation solution comprises distance and speed of the user.

16. The method of claim 14, wherein the second navigation solution comprises a route traversed by the user.

17. The method of claim 1, wherein the second navigation solution is more accurate than the first navigation solution.

18. A system for providing a plurality of navigation solutions, comprising:
   a) a portable sensor device associated with a user outputting sensor data indicative of movement of the user;
   b) a first set of processing conditions configured to derive a first navigation solution using the sensor data, wherein the first set of processing conditions are implemented by at least one of the portable sensor device, remote processing resources and at least one additional device; and
   c) a second set of processing conditions configured to derive a second navigation solution using the sensor data, wherein the second set of processing conditions are implemented by at least one of the portable sensor device, remote processing resources and at least one additional device, wherein the first navigation solution is provided in real time and the second navigation solution is provided at a time subsequent to the first navigation solution, and wherein the second navigation solution is refined as compared to the first navigation solution such that the second navigation solution is at least one of: i) more complete than the first navigation solution and ii) more accurate than the first navigation solution with respect to at least one quantity included in both the first navigation solution and the second navigation solution.

19. The method of claim 1, wherein the second processing of the sensor data is performed locally with respect to the portable sensor device.

20. The method of claim 19, wherein the second processing of the sensor data is performed by the portable sensor device.

21. The method of claim 19, wherein the second processing of the sensor data is performed by an auxiliary device associated with the user.

22. The method of claim 1, further comprising transmitting the sensor data to remote processing resources and wherein the second processing of the sensor data is performed remotely.

23. The method of claim 22, wherein the sensor data is transmitted to the remote processing resources by the portable sensor device.

24. The method of claim 22, wherein the sensor data is transmitted to the remote processing resources by an auxiliary device associated with the user.

25. The method of claim 1, wherein the second processing of the sensor data comprises multi-pass processing.

26. The method of claim 1, wherein the second processing of the sensor data comprises backward smoothing.

27. The method of claim 1, wherein the second processing of the sensor data comprises using an additional source of navigation information.

28. The method of claim 27, wherein the second processing of the sensor data comprises map matching.

29. The method of claim 1, further comprising providing information derived from the second navigation solution to the portable sensor device.

30. The method of claim 29, further comprising processing subsequent sensor data under the first set of processing conditions using the information derived from the second navigation solution.

31. The method of claim 30, wherein the information derived from the second navigation solution comprises human motion dynamics specific to the user.

32. The method of claim 29, further comprising calibrating a sensor of the portable sensor device based at least in part on the information derived from the second navigation solution.

33. The method of claim 1, wherein the sensor data comprises motion sensor data.

34. The method of claim 33, wherein the sensor data further comprises pressure sensor data.

35. The method of claim 34, wherein the second processing of the sensor data comprises matching an altitude profile.

36. The system of claim 18, wherein portable sensor device comprises an accelerometer and a gyroscope.

37. The system of claim 18, further comprising a source of absolute navigational information for the portable sensor device, wherein at least the second set of processing conditions is further configured to use the absolute navigational information to aid the at least the second navigation solution.

38. The system of claim 37, wherein the absolute navigational information is obtained from any one or any combination of the following: (i) a global navigation satellite system (GNSS); (ii) cell-based positioning; (iii) WiFi-based positioning; or (iv) other wireless-based positioning.

39. The system of claim 37, wherein the source of absolute navigational information is integrated with the portable sensor device.

40. The system of claim 37, further comprising an auxiliary device associated with the user, wherein the source of absolute navigational information is from the auxiliary device.

41. The system of claim 37, wherein the source of the absolute navigational information is configured to be duty cycled.

42. The system of claim 18, further comprising at least one auxiliary device associated with the user and configured to output sensor data.

43. The system of claim 42, wherein the sensor data from the at least one auxiliary device is used for at least one of: (i) deriving a first navigation solution under a first set of processing conditions; and (ii) deriving at least a second navigation solution under a second set of processing conditions, wherein the second navigation solution is refined as compared to the first navigation solution.

44. The system of claim 42, wherein the sensor data from the at least one auxiliary device is used together with the sensors data from the portable sensor device for at least one of: (i) deriving an enhanced first navigation solution under a first set of processing conditions; and (ii) deriving at least an enhanced second navigation solution under a second set of processing conditions, wherein the second navigation solution is refined as compared to the first navigation solution.

45. The system of claim 18, wherein the first set of processing conditions represents a reduced expenditure of resources as compared to the second set of processing conditions.

46. The system of claim 45, wherein the reduced expenditure of resources comprises the usage of less computational resources.

47. The system of claim 45, wherein the reduced expenditure of resources comprises less power consumption.

48. The system of claim 18, wherein the second navigation solution is more complete than the first navigation solution.

49. The system of claim 18, wherein the second navigation solution is more accurate than the first navigation solution.

50. The system of claim 18, wherein the second set of processing conditions is implemented in the portable sensor device.

51. The system of claim 18, further comprising an auxiliary device associated with the user, wherein the second set of processing conditions is implemented in the auxiliary device.

52. The system of claim 18, further comprising remote processing resources, wherein the second set of processing conditions is implemented in the remote processing resources.

53. The system of claim 52, further comprising a communication module in the portable sensor device configured to transmit the sensor data to the remote processing resources.

54. The system of claim 52, further comprising an auxiliary device associated with the user, wherein the auxiliary device is configured to relay the sensor data to the remote processing resources.

55. The system of claim 36, wherein the accelerometer and the gyroscope are implemented as a Micro Electro Mechanical System (MEMS).

* * * * *